CARL L. PARKER
INVENTOR.

BY Herbert J. Brown
ATTORNEY

United States Patent Office 3,217,309
Patented Nov. 9, 1965

3,217,309
PNEUMATICALLY ADJUSTABLE MONITOR FOR PRESSURIZED CABLES
Carl L. Parker, Fort Worth, Tex., assignor to Malor Manufacturing, Inc., Fort Worth, Tex., a corporation of Texas
Filed Nov. 25, 1959, Ser. No. 855,422
5 Claims. (Cl. 340—242)

This invention relates to pneumatic pressure maintenance systems and has reference to a signaling monitor for detecting pressure drops in telephone cables or the like.

To protect electrical components within telephone cables, interior pressure is maintained at a level above atmospheric pressure so that minute defects, cracks or punctures will not permit the entry of water or moisture. Gas exhaustion through a very small crevice or pin hole precludes the introduction of moisture to the interior of the cable, but, if gas leakage from a major puncture or from the cumulative effect of minor defects exceeds the rate or capacity of a pressure replenishment system then the protection of internal pressure may be lost with costly results. In the maintenance of telephone cables, knowledge of the time and sequence of pressure drops within a cable network permits workmen to locate and correct difficulties before service has been disrupted or serious damage done.

Accordingly, an object of the present invention is to provide a signaling monitor responsive to a drop in internal cable pressure below a preset level.

Another object of the invention is to provide a cable pressure monitor wherein a minimum signaling pressure may be altered and set in the field.

Another object of the invention is to provide a cable pressure monitor which cannot be triggered by weather changes and which will not transmit false signals in response to temperature fluctuations.

A further object of the invention is to provide a cable pressure monitor which can keep surveillance of its own operation as well as cable pressures in that it transmits continuously and varies its signal to discriminate between normal and low pressure conditions.

Another object of the invention is to provide a cable pressure monitor which may be used in conjunction with like monitors to transmit information from a cable system to a central computor or display board.

A further object of the invention is to provide a cable pressure monitor adapted to transmit information through telephone facilities now in general use.

These and other objects will become apparent from the following description and the accompanying drawing, wherein.

Figures 1, 2, 3, 4, 5, 6:
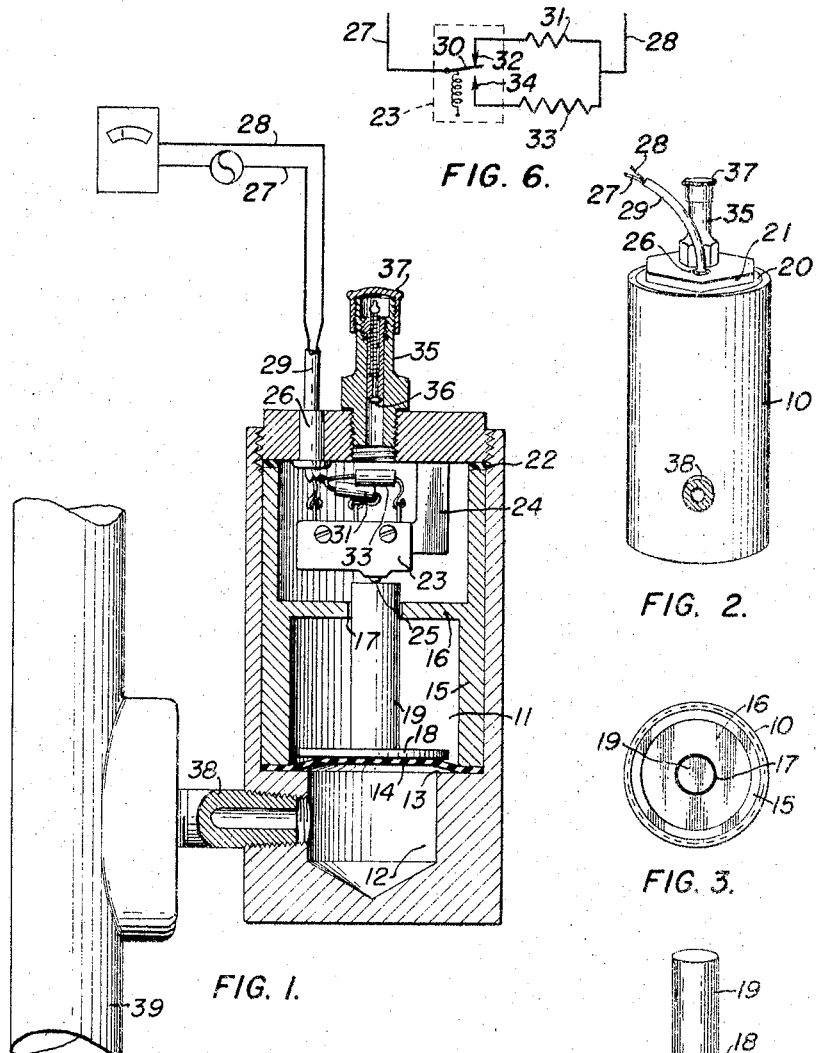
FIGURE 1 is a partially sectional view of an embodiment of the invention showing its attachment to a telephone cable and illustrating external electrical components in diagrammatic form.
FIGURE 2 is a perspective view of the invention.
FIGURE 3 is a plan view of the invention shown with its cylinder cap removed.
FIGURE 4 is a bottom view of the cylinder cap and attached parts of the invention.
FIGURE 5 is a perspective view of the plunger of the invention.
FIGURE 6 is a circuit diagram of internal components of the invention.

In the drawing, a cylinder 10 is closed at its lower end and is provided with a generally cylindrical chamber 11 coaxial with its upper portion and constituting an opening in its upper end. A cavity 12 is formed in the lower portion of the cylinder 10 as a coaxial continuation of the chamber 11 but is of less diameter than the chamber so that an upwardly facing annular shoulder 13 is formed as the base of so much of the chamber as does not communicate with and continue into the cavity. A circular diaphragm 14 of rubber or other flexible material is positioned at the base of the chamber 11 and rests upon the annular shoulder 13. A cylindrical hollow liner 15 having an outside diameter corresponding to the diameter of the chamber 11 is positioned therein and the base of the liner rests upon the periphery of the diaphragm 14. A horizontal partition 16 is integrally constructed within the liner 15 at a position therein approximately midway between its upper and lower ends. A circular opening 17 is formed through the horizontal partition 16 concentrically therewith. A metal disc 18 is positioned at the base of the chamber 11 within the liner 15 and there rests upon the diaphragm 14. The disc is larger in diameter than the cavity 12 and, hence, is supported by so much of the diaphragm 14 as rests upon the annular shoulder 13 interiorly of the liner 15. A plunger rod 19 is attached at its lower end to the disc 18 and projects upwardly therefrom in the axis of the cylinder 10 through the circular opening 17 in the horizontal partition 16 and terminates in a flat horizontal surface above the upper surface of the horizontal partition.

A cap 20 provided with lugs 21 on its upper surface, threadedly engages the interior surface of the upper end of the cylinder 10 and a gasket 22 conforming to the upper end of the liner 15 is compressed in sealing contact between the cap and the liner. A single pole double throw microswitch 23 is suspended within the chamber 11 above the partition 16 of the liner 15 by a bracket 24 depending from the cap 20. The upper end of the plunger rod 19 is in contact with the button 25 of the microswitch. A tubular seal 26 extends through the cap 20 and two electrical leads 27 and 28, known in the telephony art as a working pair, extend through the seal 26 into the chamber 11. The first lead 27 is electrically connected to the pole 30 of the microswitch. A low value resistor 31 is wired at one of its ends to the normally open contact point 32 of the microswitch and is wired at its other end to the second electrical lead 28. A high value resistor 33 is wired at one of its ends to the normally closed contact point 34 of the microswitch and is wired at its other end to the second electrical lead 28. The electrical leads constituting a working pair may be electrically connected to a central display board or may be wired to a conveniently located display device.

A valve stem 35 threadedly engaging the cap 20 communicates the chamber 11 with the exterior of the cylinder 10. A valve core 36, of the type commonly used with pneumatic tires, is positioned and secured within the valve stem so that the stem and core combination act as a check valve, sealing pressure within the chamber 11. A valve cap 37 is adapted to threadedly engage the upper end of the valve stem and to serve as a second sealing member therefor.

A pressure tube 38 extends through the cylindrical wall of the lower portion of the cylinder and communicates with the cavity 12. Exteriorly of the cylinder 10 the tube 38 communicates with the interior of a vessel, such as a telephone cable 39, in which pressure is to be monitored.

In operation, pressure from within a cable 39 is transmitted through the pressure tube 38 into the cavity 12 in the lower portion of the cylinder 10. Assuming that the chamber 11 in the upper portion of the cylinder is not pressurized, pressure within the cavity 12 bears against the diaphragm 14, flexing it upwardly, and forcing the disc 18 and plunger rod 19 upwardly within the cavity against the button 25 of the micro-switch 23. Depression of the button 25 places the pole 30 of the microswitch in its abnormal position against the contact point 34 electrically connected to the high value resistor 33. With the pole 30 in this position, the high value resistor 53 is in the circuit of the working pair 27 and 28 and a current of relatively low value flows through the circuit. If the pressure within the cable 39 is lost, the pole 30 of the microswitch 23 returns to its normal position in contact with the terminal 32 attached to the low value resistor 31. With the pole 30 in this position, the low value resistor 31 is placed in the circuit of the working pair 27 and 28 of leads and a relatively high current flows through the circuit. Hence, it is seen that a relatively low current value is maintained in the working pair 27 and 28 so long as the pressure in the cavity 12 exceeds the pressure in the chamber 11. If air pressure is forced into the chamber 11 through the valve stem 35 and there held by the valve core 36, a high current signal will flow through the working pair unless or until the pressure within the cable 39 exceeds the chamber pressure; so long as the cable pressure is the greater, a low current signal will flow in the circuit.

Small pumps or pressure reservoirs may be used in conjunction with simple pressure gauges to set or adjust cavity pressures in the field. Since the signal current is controlled by gas pressures opposing one another through the diaphragm 14, coefficients of expansion of operating forces are dynamically balanced in the monitor and temperature changes affecting the whole unit cannot give rise to false signals.

The invention is not limited to the exemplary construction herein shown and described but may be made in various ways within the scope of the appended claims.

What is claimed is:

1. A pressure monitor comprising: a cylinder, a closed chamber in one end of said cylinder, a cavity in the other end of said cylinder, a diaphragm separating said chamber from said cavity, a single pole double throw switch in said chamber, a plunger in said chamber coacting at one end with said diaphragm and at its other end with said switch, a first lead electrically connected to the pole of said switch, a second electrical lead, a low value resistor wired between one contact point of said pole of said switch and said second electrical lead, a high value resistor wired between the other contact point of said pole of said switch and said second electrical lead, means connecting said leads to a current carrying sensing device, means providing constant pneumatic pressure in said chamber, and means pneumatically communicating said cavity with a vessel to be monitored.

2. The invention as defined in claim 1 and wherein said means providing constant pneumatic pressure in said chamber includes a valve stem communicating said chamber with the exterior thereof, and a valve core in said valve stem.

3. A pressure monitor comprising: a diaphragm, a chamber communicating with one side of said diaphragm, a second chamber communicating with the other side of said diaphragm, a single pole double throw switch in mechanical engagement with said diaphragm, a resistor electrically connected at its first terminal to the normally open contact point of said switch, a second resistor differing in value from said first resistor and electrically connected at its first terminal to the normally closed contact point of said switch, a first lead electrically connected to the pole of said switch, a second lead electrically connected to the second terminal of said first resistor and to the second terminal of said second resistor, and constant pneumatic means communicating one of said chambers with a vessel to be monitored.

4. The invention as defined in claim 3 and including a valve stem communicating with the other of said chambers, and a valve core within said stem.

5. The invention as defined in claim 1 and wherein said single pole double throw switch in said chamber is constructed in the form of a pushbutton type microswitch characterized by short button travel and low biasing tension.

References Cited by the Examiner
UNITED STATES PATENTS

| | | | |
|---|---|---|---|
| 1,147,949 | 7/15 | Keen. | |
| 2,004,769 | 6/35 | Shanklin. | |
| 2,165,569 | 7/39 | Obermaier | 340—244 XR |
| 2,320,886 | 6/43 | Quiroz. | |
| 2,394,911 | 2/46 | Grinswold | 137—525 X |
| 2,529,028 | 11/50 | Landon | 137—525 X |
| 2,555,306 | 6/51 | Atkinson | 324—115 XR |
| 2,594,216 | 4/52 | Roeser | 200—67 |
| 2,672,602 | 3/54 | Rees | 340—242 |
| 2,767,392 | 10/56 | Szwargulski | 340—242 |
| 2,773,251 | 12/56 | Snyder | 340—242 |
| 2,787,681 | 4/57 | Roeser | 200—81 XR |
| 3,025,504 | 3/62 | Ohse | 340—240 |
| 3,070,746 | 12/62 | Moore et al. | 324—115 XR |

NEIL C. READ, *Primary Examiner.*
BENNETT G. MILLER, ROBERT H. ROSE,
*Examiners.*